E. SCHNEIDER.
TRANSPORT APPARATUS FOR DEMOUNTING AND REMOUNTING GUN BARRELS.
APPLICATION FILED MAR. 31, 1919.

1,345,891. Patented July 6, 1920.

E. SCHNEIDER.
TRANSPORT APPARATUS FOR DEMOUNTING AND REMOUNTING GUN BARRELS.
APPLICATION FILED MAR. 31, 1919.

1,345,891.

Patented July 6, 1920.
8 SHEETS—SHEET 2.

E. SCHNEIDER.
TRANSPORT APPARATUS FOR DEMOUNTING AND REMOUNTING GUN BARRELS.
APPLICATION FILED MAR. 31, 1919.

1,345,891.

Patented July 6, 1920.
8 SHEETS—SHEET 5.

E. SCHNEIDER.
TRANSPORT APPARATUS FOR DEMOUNTING AND REMOUNTING GUN BARRELS.
APPLICATION FILED MAR. 31, 1919.

1,345,891.

Patented July 6, 1920.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

TRANSPORT APPARATUS FOR DEMOUNTING AND REMOUNTING GUN-BARRELS.

1,345,891.     Specification of Letters Patent.     Patented July 6, 1920.

Application filed March 31, 1919. Serial No. 286,486.

*To all whom it may concern:*

Be it known that I, EUGÈNE SCHNEIDER, a citizen of the French Republic, and a resident of Paris, 42 Rue d'Anjou, France, have invented a new and useful Improvement in Transport Apparatus for Demounting and Remounting Gun-Barrels, which invention is fully set forth in the following specification.

This invention has for its object to provide improved apparatus for separating the gun barrel from the gun carriage, transporting the gun barrel and replacing the gun barrel upon the gun carriage, in the case of guns of large caliber.

The improved apparatus for the transport of the gun barrel separated from its carriage, is characterized by a fore-wheeled axle upon the pivot bolt of which there is mounted in such a manner as to be able to pivot around the same, a collar forming two parts which are connected together by hinges and constitute bearings for the chase of the gun barrel between two flanges or ribs formed on the latter. This fore-wheeled axle is combined with a rear-wheeled axle comprising a supporting cradle adapted to be placed between two flanges formed on the gun barrel at a suitable distance in front of the breech.

The placing of the gun barrel upon this combined fore-wheeled axle and rear-wheeled axle is effected by an apparatus the essential characteristic features of which are: two removable slide tracks pivoted to the carriage cradle at their rear ends while they bear with their front ends upon supporting jacks. These tracks are practically extensions of the cradle and they serve as a rest for the rear part of the gun barrel which is caused to slide forward after the chase has been fastened to the fore-wheeled axle.

A practical construction of this invention is illustrated by way of example in the accompanying drawings in which:

Figures 1 to 5 inclusive illustrate the improved fore-wheeled axle and the corresponding portion of the chase of the gun barrel.

Figures 1, 2:
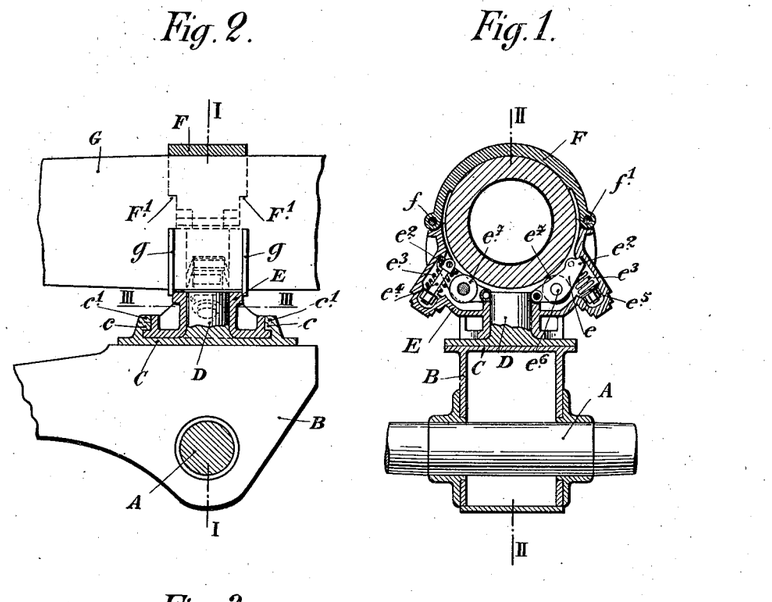
Fig. 1 is a partial vertical section along the axis of the axle; the section being taken on the line I—1 of Fig. 2.
Fig. 2 is a vertical section on the line II—II of Fig. 1.
Figure 3:
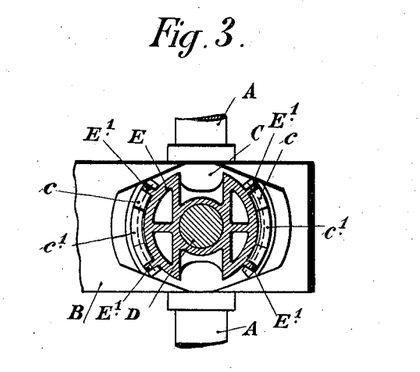
Fig. 3 is a horizontal section on the line III—III of Fig. 2.

Referring to Figs. 1 to 3, A is the axle of a fore-wheeled axle, the framing B of which carries a pivot bolt D projecting from a saddle C. Around this pivot bolt D and in guide grooves *c* formed in the saddle C, there is adapted to pivot a collar made in two parts E, F. This collar is constructed to form a bearing for supporting and holding the chase G of the gun barrel, which latter it embraces between two partial flanges or ribs *g*.

Figures 4, 5:
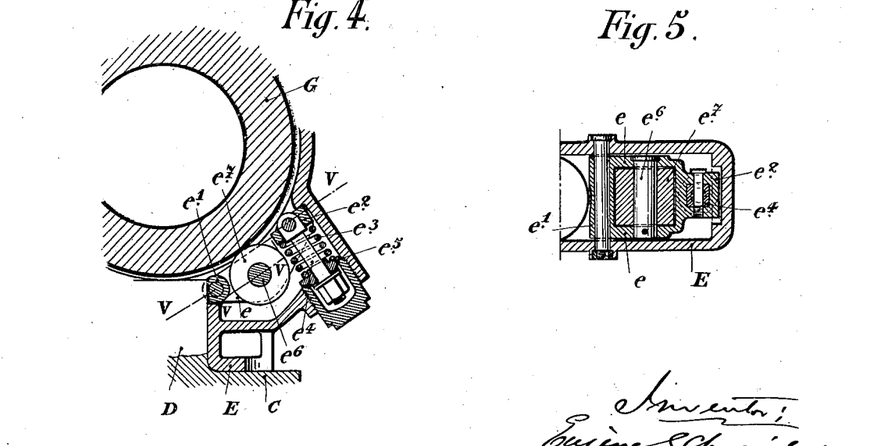
Figs. 4 and 5 are respectively a vertical section and a horizontal section on the line V—V of Fig. 4 of a detail of an elastic support formed in the collar of the fore-wheeled axle.

The lower collar half E is preferably constructed to form an elastic support as shown in Figs. 1, 4 and 5. For this purpose it may comprise two levers $e$ hinged at one end $e^1$ to the body of the collar and bearing with their opposite ends $e^2$ upon a spring $e^3$ maintained between the head of a stem $e^4$ which is pivoted at that end, and a washer $e^5$. Each of these levers is provided at an intermediate point of its length with a pin $e^6$ carrying a roller $e^7$ upon which the gun barrel rests.

The upper collar half F may be connected to the lower collar half E by hinges $f$, $f^1$ in such a manner that the disjointing of one of these hinges will allow the said collar half F to be turned down on the other hinge for the purpose of removing the fore-wheeled axle.

The pivotal movement of the fore-wheeled axle relatively to the gun barrel, may be limited by means of projections $c^1$ formed on the guide grooves $c$ abutting against stops $E^1$ formed on the collar half E. The transverse rotation of the fore-wheeled axle relatively to the gun barrel, or vice versa, may be limited by the edges $F^1$ of the upper collar half abutting against the ribs or flanges $g$.

Figure 6:
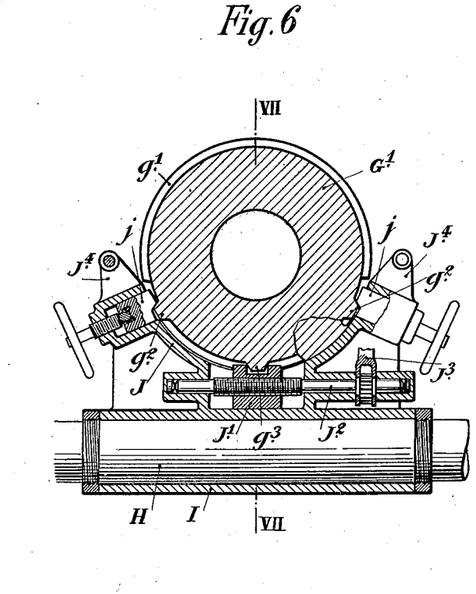
Fig. 6 is a vertical section along the axis of the axle of the rear-wheeled axle; this section is taken on the line VI—VI of Fig. 7.
Figure 7:
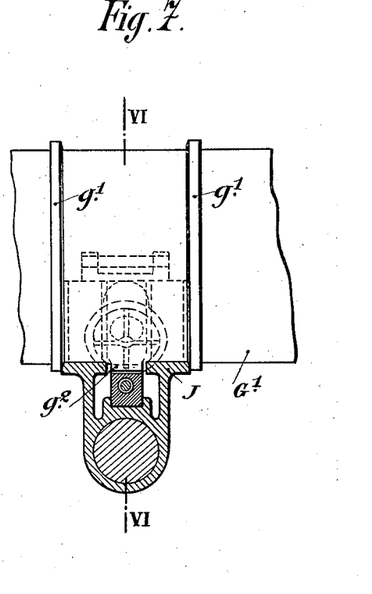
Fig. 7 is a corresponding vertical section on the line VII—VII of Fig. 6.

The rear-wheeled axle shown in Figs. 6 and 7 comprises, on a sleeve I through which passes the axle H, a cradle or half collar J on which the rear portion $G^1$ of the gun barrel is adapted to rest. The said portion is provided for this purpose with two collars $g^1$ between which the cradle J is held. It also has nibs $g^2$ against which are adapted to abut two stop bolts $j$ working in the cradle J.

The rear-wheeled axle comprises a device the use of which is hereinafter described, which allows, after the stop bolts $j$ have been first moved into inoperative position, of imparting to the gun barrel a limited rotational movement around its longitudinal axis. In the example shown, the gun barrel is formed with a nib $g^3$ engaging in a notch in a nut $J^1$ working on a screw $J^2$ journaled in the cradle J. By means of a ratchet lever $J^3$ the screw $J^2$ may be rotated in the desired direction for producing a longitudinal movement of the nut $J^1$, and consequently a slight rotation of the gun barrel on its axis.

Figs. 8 to 11ª illustrate the invention as applied by way of example to a gun whose barrel is fastened to a slide K which is adapted to recoil during the firing, along the slides of a cradle L which is journaled in a bracket M. This bracket M is assumed to be carried by a frame N which is adapted to rotate on a vertical pivot on a platform O.

Figure 8:
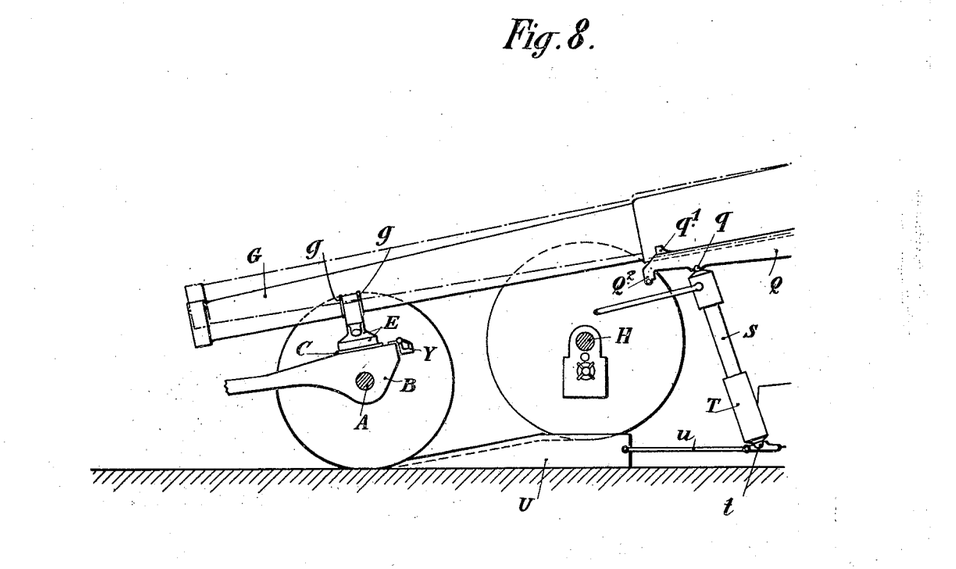
Figs. 8 to 11ª inclusive illustrate, in different positions, the combination of the improved fore-wheeled axle and rear-wheeled axle with the apparatus for separating the gun barrel from the gun carriage, and the placing of the gun barrel upon its wheeled axles.
Figure 8A:
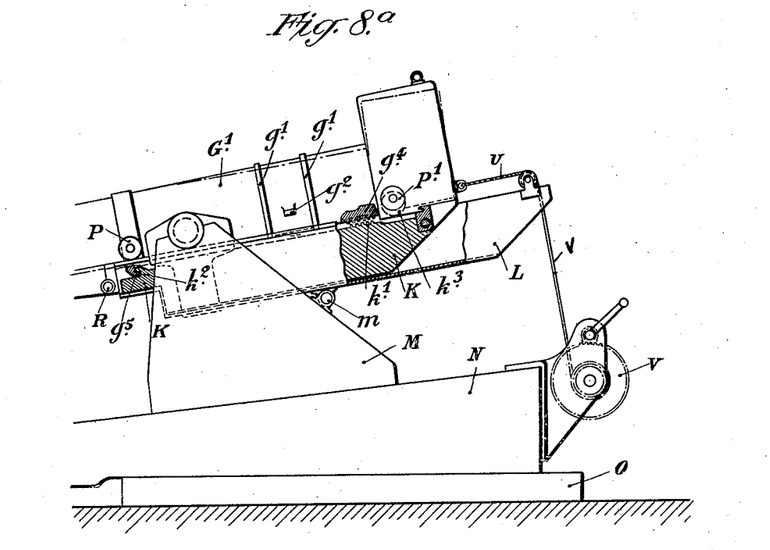

The combination K—L—M—N—O is designed to be transported separately by known means, the present invention concerning solely the apparatus for transporting the gun barrel G—$G^1$ after the latter has been separated from the said combination. The fastening between the gun barrel and the slide K is effected by any known means, such as for instance the means forming the subject matter of my invention for which a patent was applied for on the 6th August 1917, and numbered Sr. 184,650, and which application eventuated in Patent No. 1,310,883, July 22, 1919. As shown diagrammatically in Fig. 8ª, this fastening comprises teeth $g^4$ formed on the gun barrel and adapted to engage with corresponding teeth $k^1$ formed on the slide. At the front end of the slide the gun barrel engages by means of a stop $g^5$ in a socket $k^2$ of the slide.

For the purpose of facilitating the movements of the gun barrel along the slideways of the cradle after the gun barrel has been unfastened from its slide, it is provided with two pairs of rollers P, $P^1$. Normally when the gun barrel is fastened on its slide, the rear rollers $P^1$ rest in depressions $k^3$ in the slide.

Figure 12:
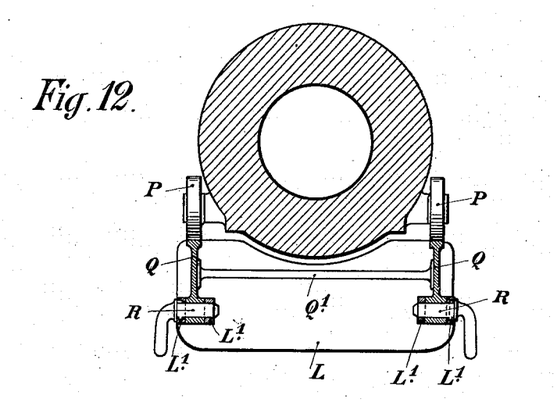
Fig. 12 is a cross section through the extension tracks.

The apparatus for effecting the transference of the gun barrel G—$G^1$ on to the vehicle constituted by the fore-wheeled axle and rear-wheeled axle hereinbefore described, comprises two slide tracks constituted by extensions Q (Fig. 12), which are placed in position when it is desired to mount or dismount the gun barrel. Each of these extensions Q consists of a simple arm forming by its upper edge a track for the rollers P and adapted to be engaged by its rear end by means of removable pins R between lugs $L^1$ formed on the cradle L. The arms Q are adapted to be connected together by means of stays $Q^1$. Near their front ends the extensions Q bear each by means of a spherical head $q$ upon one of the elements of a jack S, the other element T of which rests in its turn by means of a spherical joint $t$ upon the gun carriage frame N. Toward their front ends the extensions Q are provided with a stop $q^1$ for the rollers P of the gun barrel.

In Figs. 8, 8ª the dot and dash lines indicate the position of the gun barrel when fastened on its slide before being dismounted.

In order to effect the dismounting and the transference of the gun barrel to its transport vehicle, the rear-wheeled axle of the vehicle is brought upon a ramp U which is connected by rods $u$ to the gun carriage frame N. The rear-wheeled axle is thus caused to occupy a clearly determined position relatively to the gun carriage and the gun barrel. The position of the gun barrel relatively to the gun carriage is determined, for the purpose of dismounting, by means of a bolt $m$ which locks the cradle L to the bracket M. On the other hand the fore-wheeled axle is brought under the chase of the gun barrel approximately at the place of the ribs $g$.

The gun barrel is then unfastened from its slide, the rear portion of the gun barrel being thus raised and the rollers $P^1$ being disengaged from the depressions $k^3$.

By acting upon the windlass V in such a manner as to slacken the retaining cable $v$, the gun barrel can be allowed to slide in the forward direction. In this movement the rollers P will roll over the extensions Q which are held in the prolongation of the slideways of the cradle by the fact that they are supported by the jacks S. In this downward movement the chase G may be allowed to rest upon the lower collar half E of the front wheeled axle, and then the upper collar half F is turned down in order to complete the fastening of the chase upon the fore-wheeled axle.

Figure 9:
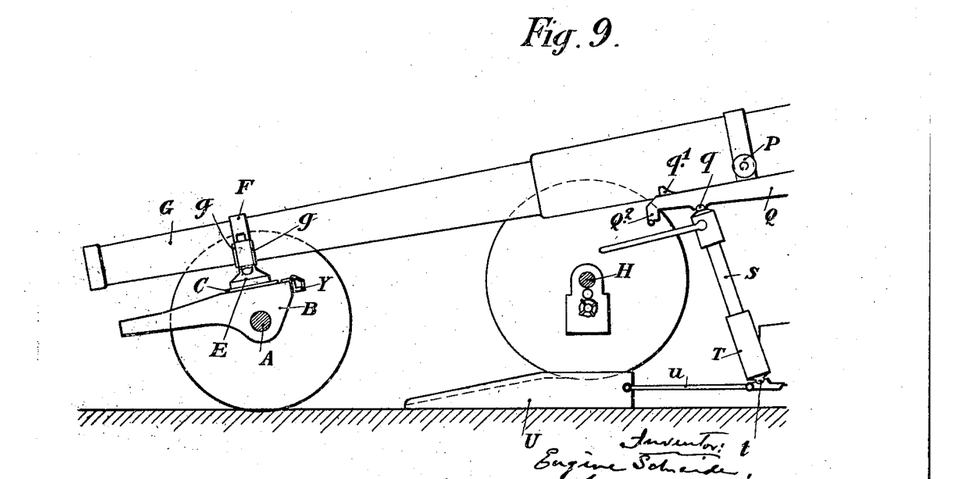
Figure 9A:
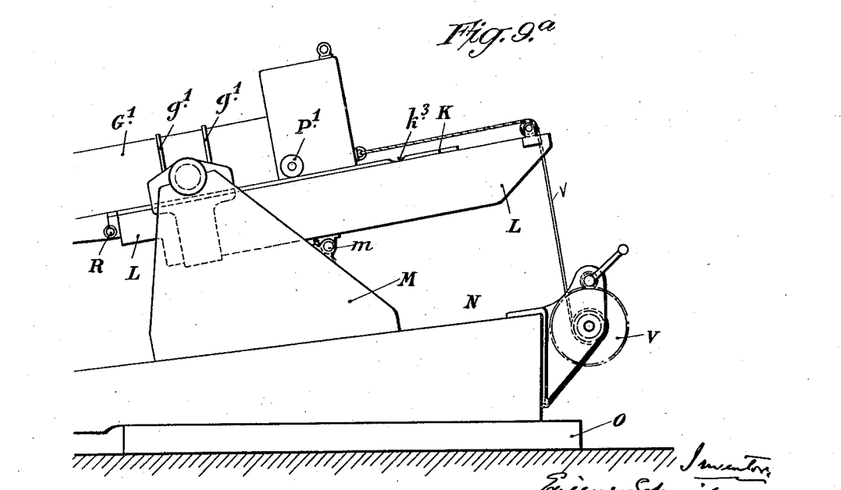
Figure 10:
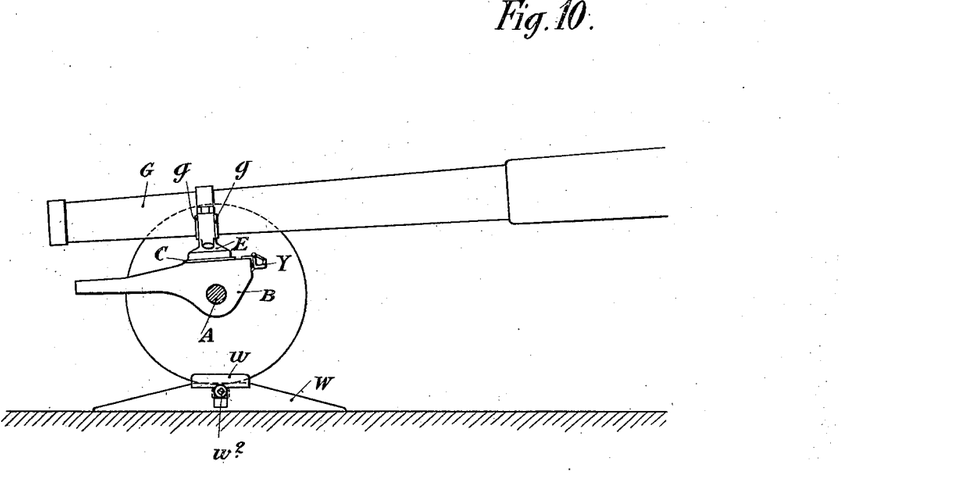
Figure 13:
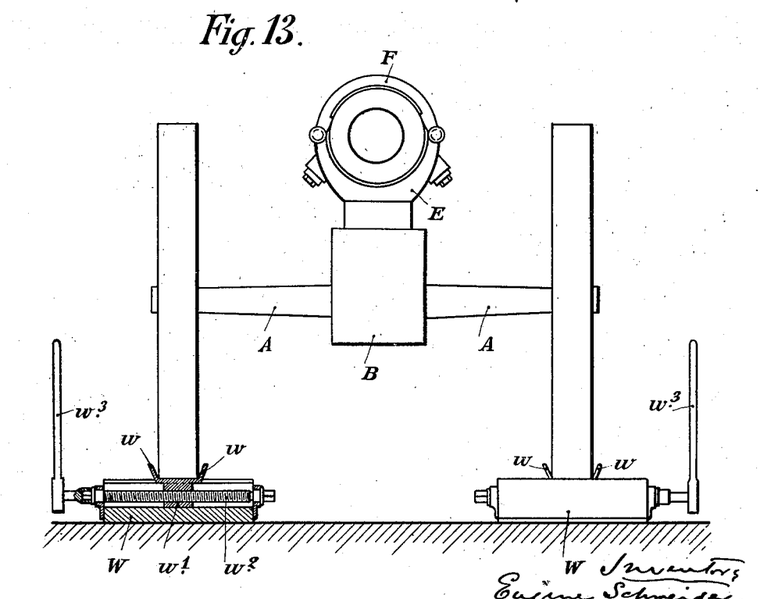
Fig. 13 is a front end elevation of the fore-wheeled axle mounted on an arrangement of wedges provided with an improved mechanism for moving the said fore-wheeled axle transversely in relation to the gun carriage.

The movement of the gun barrel from this moment onward may be aided by exerting a pull upon the fore-wheeled axle (Fig. 9). In this manner the gun barrel can be brought into the position shown in Figs. 10, $10^a$; the fore-wheeled axle having been finally brought upon the ramps W (Figs. 10, 11 and 13) which serve more particularly for the operation of remounting the gun. At this moment the gun barrel is not supported except by the fore-wheeled axle and the extensions Q. From this moment onward, by operating the jacks S—T, the extensions can be caused to tilt on their pivot R connecting them to the cradle. In this movement the rear portion $G^1$ comes finally to rest in the cradle of the rear-wheeled axle H (Fig. $11^a$). The gun vehicle has now been formed.

Figure 11:
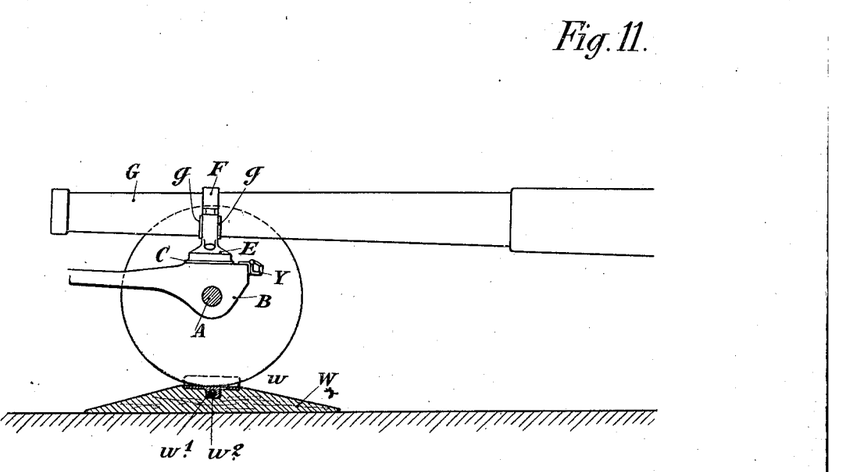

Inversely, for remounting the gun, the gun vehicle is brought into the position shown in Fig. 11. If the axial vertical plane of the gun barrel should not coincide exactly with the vertical axial plane of the gun carriage, the parallelism between these planes may be first assured by causing the gun barrel to rotate slightly on its axis by means of the hereinbefore described mechanism carried by the rear-wheeled axle. The coincidence of these planes may be finally assured by a transverse displacement of the fore-wheeled axle on the ramps W by means of the mechanism shown in Fig. 13. The wheels of the fore-wheeled axle rest as shown in this figure, in channels $w$ carried by nuts $w^1$ working on screws $w^2$ journaled in bearings formed on the ramps W. In order to move the nuts $w^1$, the screws $w^2$ are actuated by means of the ratchet lever $w^3$. When this has been done, the jacks S—T are operated to raise the extensions Q, and by means of the latter, the rear portion of the gun barrel; the whole then occupying the position shown in Figs. 10, $10^a$. By operating the windlass V, the parts are brought finally into the position shown in full lines in Figs. 8, $8^a$. At this moment the separation between the fore-wheeled axle and the gun chase may be effected; the separation between the rear-wheeled axle and the gun barrel having been already effected previously in passing from the position shown in Fig. $11^a$ into the position shown in Fig. $10^a$.

When the gun barrel has been remounted upon its carriage, the extensions Q may be removed.

Figure 14:
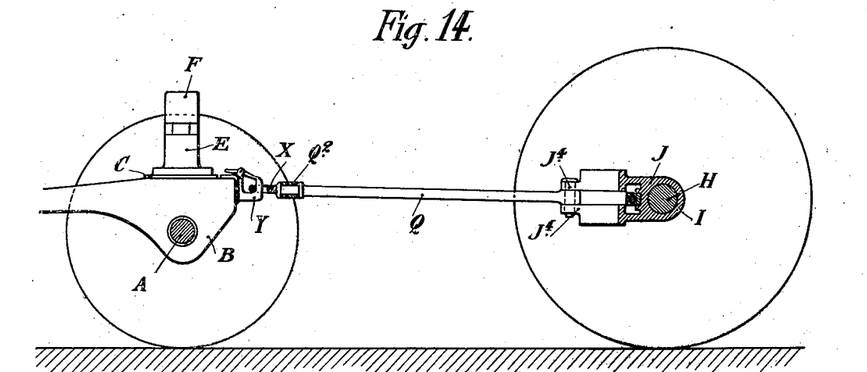
Figs. 14 and 15 illustrate respectively in side elevation and in plan the construction of an accessory vehicle out of the improved fore-wheeled axle and rear-wheeled axle and the extension slide tracks for the separate transport of the latter when the gun barrel is mounted on its carriage.
Figure 15:
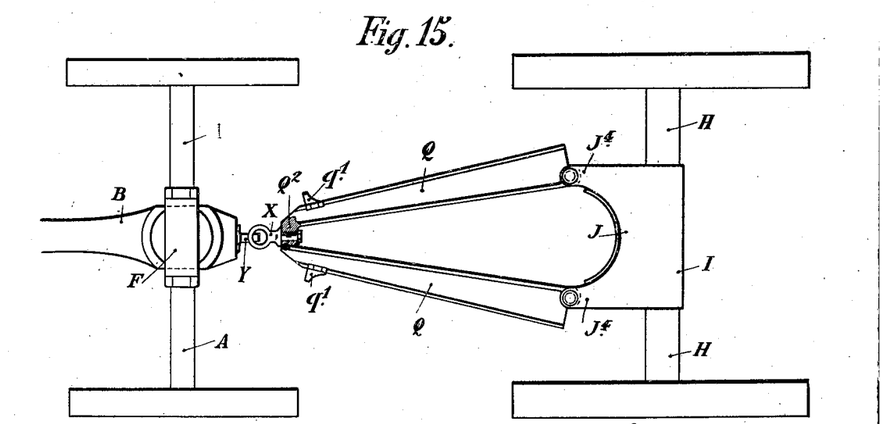

In the case where, for transporting the gun through a short distance, the gun barrel is not separated from the carriage, then, as shown in Figs. 14 and 15 a vehicle may be formed by connecting together the fore-wheeled axle and the rear-wheeled axle by means of the cradle extensions Q. The half collar of the rear-wheeled axle is formed for this purpose with lugs $J^4$ to which the rear ends of the extensions Q are pivoted, after having first turned the collar down into a horizontal plane.

One of the extensions Q may be provided with an eye $Q^2$ with a yoke X to which the other extension is fastened by means of a suitable bolting device. The yoke X is adapted to be coupled to a hook Y on the fore-wheeled axle.

What I claim is:

1. In transport apparatus for demounting and remounting gun-barrels, a fore-wheeled axle, a saddle journaled on said axle having a pivot-bolt projecting from the same perpendicular to said axle, a collar adapted to receive the chase of the gun-barrel journaled on said pivot-bolt to permit horizontal angular movement of the gun-barrel relative to the longitudinal axis of said saddle, a rear-wheeled axle movable independently of the fore-wheeled axle to be positioned relative to the gun-barrel, and a cradle on said rear-wheeled axle adapted to receive the breech of the gun-barrel.

2. In transport apparatus for demounting and remounting gun-barrels, a fore-wheeled axle, a collar on said axle adapted to receive the chase of the gun-barrel, a rear-wheeled axle movable independently of the fore-wheeled axle to be positioned relative to the gun-barrel, a cradle on said rear-wheeled axle adapted to receive the breech of the gun-barrel, and mechanism on said cradle for rotating the gun-barrel around its longitudinal axis to position the same relative to the vertical plane of the gun-carriage preliminary to remounting.

3. In transport apparatus for demounting and remounting gun barrels, a fore-wheeled axle, a saddle journaled on said axle having a pivot-bolt projecting from the same perpendicular to said axle, a collar adapted to receive the chase of the gun-barrel journaled on said pivot-bolt to permit horizontal angular movement of the gun-barrel relative to the longitudinal axis of the gun-carriage preliminary to remounting, a rear-wheeled axle movable independently of the fore-wheeled axle to be positioned relative to the gun-barrel, a cradle on said rear-wheeled axle to receive the breech of the gun-barrel, and mechanism on said cradle for rotating the gun-barrel around its longitudinal axis to position the same relative to the vertical plane of the gun-carriage preliminary to remounting.

4. In transport apparatus for demounting and remounting gun-barrels, adjustable arms forming auxiliary extensions of the gun-carriage tracks to support the gun-barrel as the latter is transferred either to or from the gun-carriage, and independently movable wheeled axles adapted to be positioned relative to the gun-carriage to successively receive the gun-barrel from the adjustable arms in demounting or to successively deliver the gun-barrel to said arms in remounting.

5. In transport apparatus for demounting and remounting gun-barrels, adjustable arms forming auxiliary extensions of the gun-carriage tracks to support the gun-barrel as the latter is transferred either to or from the gun-carriage, independently movable wheeled axles adapted to be positioned relative to the gun-carriage to successively receive the gun-barrel from the adjustable arms in demounting or to successively deliver the gun-barrel to said arms in remounting, and mechanism for adjusting the elevation of said arms to accommodate the movement of the gun-barrel thereon either from the gun-carriage to the wheeled axles in demounting or from the wheeled axles to the gun-carriage in remounting.

6. In transport apparatus for demounting and remounting gun-barrels, arms hinged to the gun-carriage to form auxiliary extensions of the gun-carriage tracks to support the gun-barrel as the latter is transferred either to or from the gun-carriage, independently movable wheeled axles adapted to be positioned relative to the gun-carriage to successively receive the gun-barrel from the hinged arms in demounting or to successively deliver the gun-barrel to said arms in remounting, and lifting-jacks positioned beneath the free ends of said arms to adjust the elevation of the same to accommodate the movement of the gun-barrel thereon in either demounting or remounting the same.

7. In transport apparatus for demounting and remounting gun-barrels, adjustable arms forming auxiliary extensions of the gun-carriage tracks to support the gun-barrel in its movements from and to the gun-carriage, mechanism for adjusting the elevation of said arms, a fore-wheeled axle, a saddle journaled on said axle, a collar pivoted on said saddle to receive the chase of the gun-barrel and to permit horizontal angular movement of the gun-barrel relative to the longitudinal axis of the saddle and of the gun-carriage, mechanism for transverse adjustment of the fore-wheeled axle to position the gun-barrel carried thereby relative to the vertical plane of the gun-carriage, a rear-wheeled axle, a cradle on the rear-wheeled axle to receive the breech of the gun-barrel, and mechanism on said cradle for rotating the gun-barrel on its longitudinal axis to position the same relative to the vertical plane of the gun-carriage preliminary to remounting.

8. In transport apparatus for demounting and remounting gun-barrels, a wheeled axle, a saddle journaled on said axle, a collar pivoted on said saddle adapted to engage the gun-barrel, and an elastic support carried in the lower part of said collar to be interposed between said collar and the gun-barrel seated therein.

9. In transport apparatus for demounting and remounting gun-barrels, a wheeled axle, a saddle journaled on said axle, a collar adapted to engage the gun-barrel pivoted on said saddle, levers carrying rollers pivoted in the lower part of the collar, and springs interposed between the collar and said levers to press the rollers against the gun-barrel to form an elastic support for the gun-barrel.

10. In transport apparatus for demounting and remounting gun-barrels, a wheeled axle, a saddle journaled on said axle carrying a pivot-bolt projecting perpendicularly from the axis of said axle, a collar formed of upper and lower parts hinged together adapted to receive the gun-barrel, said collar being journaled on the pivot-bolt to permit horizontal angular movement of the gun-barrel relative to the longitudinal axis of said saddle, levers carrying rollers pivoted in the lower part of the collar, and springs interposed between the lower part of the collar and the levers to force the rollers against the gun-barrel to press the latter upwardly against the upper part of the collar.

11. In transport apparatus for demounting and remounting gun-barrels, a wheeled axle, a cradle journaled on said axle to receive the gun-barrel, and mechanism on said saddle for rotating the gun-barrel carried thereby around its longitudinal axis.

12. In transport apparatus for demounting and remounting gun-barrels, a wheeled axle, a cradle journaled on said axle to receive the gun-barrel, mechanism on said cradle for rotating the gun-barrel carried thereby around its longitudinal axis, and adjustable stops on the cradle to engage the gun-barrel to limit the turning of the same on its longitudinal axis.

13. In transport apparatus for demounting and remounting gun-barrels, a wheeled axle, a cradle journaled on said axle to receive the gun-barrel, a threaded shaft rotatable in the cradle, a nut on the threaded shaft and adapted to engage the gun-barrel so that the travel of the nut will turn the gun-barrel in the cradle on its longitudinal axis.

In testimony whereof I have signed this specification.

EUGÈNE SCHNEIDER.